United States Patent [19]

Niimi

[11] Patent Number: 5,746,412

[45] Date of Patent: May 5, 1998

[54] ELECTROMAGNETIC VALVE DEVICE AND MANUFACTURING METHOD FOR THE SAME

[75] Inventor: Shigeki Niimi, Kariya, Japan

[73] Assignee: Aisin Seiki Kabushiki Kaisha, Kariya, Japan

[21] Appl. No.: 535,828

[22] Filed: Sep. 28, 1995

[30] Foreign Application Priority Data

Sep. 28, 1994 [JP] Japan ................................. 6-233868

[51] Int. Cl.⁶ ................................................. F16K 31/06
[52] U.S. Cl. ................................................. 251/129.15
[58] Field of Search ..................... 251/129.15, 129.01, 251/366, 367; 335/255, 278, 281, 282

[56] References Cited

U.S. PATENT DOCUMENTS

| 4,262,877 | 4/1981 | Lang ......................... 251/129.15 |
| 5,143,301 | 9/1992 | Reiter et al. |

FOREIGN PATENT DOCUMENTS

| 3927150 | 8/1989 | Germany. |
| 3942306 | 12/1989 | Germany. |
| 4301670 | 1/1993 | Germany. |
| 63-56371 | 4/1988 | Japan. |
| 63-235778 | 9/1988 | Japan. |
| 6-013227 | 1/1994 | Japan. |
| 6241340 | 8/1994 | Japan. |
| 565143 | 7/1977 | U.S.S.R. ..................... 251/129.15 |

*Primary Examiner*—Kevin Lee
*Attorney, Agent, or Firm*—Sughrue, Mion, Zinn, Macpeak, and Seas.

[57] ABSTRACT

An electromagnetic valve device capable of reducing the number of assembled parts and manufacturing cost thereof includes a stable core arranged in a solenoid, a movable core slidable in the solenoid to form a magnetic gap with the stable core, a casing made of magnetic material and provided with a holder portion extending along the outer periphery of the solenoid and a yoke portion extending inside of the solenoid in sliding contact with the movable core, and a base made of synthetic resin unitedly molded with the casing and opposed to the movable core so as to form a valve member with the movable core. The yoke portion of the casing can sufficiently contact the movable core so as to allow the movable core to act as a valve with the base in association with a return spring for normally biasing the movable core toward the base. The casing and the base are unitedly molded to prevent positional deviations of the axial centers therebetween so that the base and the movable core can properly serve as a valve to open and close a fluid passage with less leakage therefrom.

4 Claims, 3 Drawing Sheets

ELECTROMAGNETIC VALVE DEVICE AND MANUFACTURING METHOD FOR THE SAME

BACKGROUND OF THE INVENTION

1. Field of the Invention

This invention relates to an electromagnetic valve device in which a movable core is controlled by energizing a coil and to a manufacturing method for the same.

2. Description of Related Art

A device disclosed in Japanese Utility Model Unexamined Publication (KOKAI) No. Showa 63-56,371, has been known as a conventional electromagnetic valve device. FIG. 6 is a cross section showing the electromagnetic valve device disclosed in the Publication above. The electromagnetic valve device 30 includes a solenoid 32 wound around a bobbin 31, a stable core 33 placed in the bobbin 31, a plunger 34 slidably provided in the solenoid 32 so as to form a magnetic gap with the stable core 33, a base 35 opposed to the solenoid 32 and provided to form a fluid passage, a valve member 36 in the form of a ball to be seated at the base 35 and made of non-magnetic material to open and close the fluid passage according to the sliding action of the plunger 34, a magnetic frame 37 located outside of the solenoid 32 for forming a magnetic path, and a yoke 38 held between the solenoid 32 and the plunger 34 and between the solenoid 32 and the base 35 with a flange in contact with the magnetic frame 37.

With such a valve device, it is require to provide the yoke 38 made of magnetic material in order to form a magnetic circuit between the magnetic frame 37 and the plunger 34. The yoke 88 may increase the number of assembly parts and the cost of the device, because the yoke 38 is a separate member from the base 35 and the plunger 34. A method to form the base 35 and the yoke 38 in a united body may be a possible solution to this problem, but may on the other hand raise a problem that it would require additional steps such as cutting and sintering steps during the fabrication of the base 35 if the base 35 is made of magnetic material, thereby increasing the manufacturing cost for the electromagnetic valve device overall. If the base 35 is made of magnetic material, the plunger 34 may be attracted to the base 35 due to residual magnetism in the base 35 even after the solenoid 32 which had been excited becomes not excited. As another problem, with such a conventional device, the axial centers of the valve seats of the plunder 34 and the base 35 may be shifted during assembling of the device due to existence of the solenoid 32 and the yoke 38 in a space between the plunger 34 and the magnetic frame 37. The ball shaped valve member 36 has to be provided between the base 35 and the plunger 34 so as to surely contact with the seat of the base 35, and this arrangement was one of the reasons leading to higher costs.

SUMMARY OF THE INVENTION

It is an object of the invention to provide an electromagnetic valve device less expensive than conventional devices without losing practical functions thereof.

An electromagnetic valve device according to the invention includes: a solenoid wound around a hollow bobbin a stable core made of magnetic material and formed so as to extend from the inside of the solenoid to one side end of the solenoid; a casing made of magnetic material, formed with a cylindrical yoke portion to be located inside of the solenoid, formed so as to extend from the yoke portion to the other side end of the solenoid, and formed unitedly with a holder portion which is extending along the outer periphery of the solenoid, the holder contacting an end of the stable core; a movable core made of magnetic material and slidably arranged inside of the yoke portion of the casing; a base secured to the casing for serving as a valve in cooperation with the movable core by contacting and non-contacting actions therebetween; and an elastic member mounted between the stable core and the movable core for biasing the movable core in a direction that the passage formed by the base and the movable core is closed.

When the solenoid is not excited, the valve is closed because the movable core is biased toward the base by elastic force of the elastic member. In this electromagnetic valve device, the movable core, the yoke portion and the holder portion of the casing, and the stable core constitute a magnetic circuit. When the solenoid is in turn excited, a or magnetic attracting force, flows through the magnetic circuit. A magnetic gap is exclusively formed between the movable core and the stable core in the magnetic circuit established in the electromagnetic valve device. The movable core therefore is urged in a direction to reduce the magnetic gap between the movable core and the stable core because the magnetic attracting force overcomes the elastic force of the elastic member. The seat of the base is consequently separated from the movable core, thereby opening the passage.

According to the embodiment of the invention, the stable core can be formed by pressing a plate made of magnetic material Furthermore, the base can be formed of resin material and be molded unitedly with the casing to avoid positional deviations of axial centers between the base and the movable core.

The electromagnetic valve device can be manufactured by unitedly molding a solenoid wound on a hollow bobbin, monitoring a stable core of magnetic material extending from the inside of the solenoid to one side end of the solenoid, a casing formed with a cylindrical yoke portion extending the inside of the solenoid and a holder portion extending along the outer periphery of the solenoid and formed so as to extend from the yoke portion to the other side end of the solenoid, and a base provided with a passage extending the yoke portion of the casing at a connection between the yoke portion and the holder portion of the casing, by containing inside of the yoke portion of the casing a movable core formed slidably inside of the yoke portion of the casing and capable of shutting the passage of the base, by inserting the solenoid between the yoke portion and the holder portion, by sandwiching an elastic member between the movable core and the stable core, by inserting the stable core in the solenoid, and by securing an end of the stable core and an end of the holder portion. According to this method, the solenoid, the movable core, the elastic member, the stable core, respectively, can be readily assembled from one side of the device after the base is unitedly molded with the casing.

BRIEF DESCRIPTION OF THE DRAWINGS

The above and other objects and features of the invention are apparent to those skilled in the art from the following preferred embodiments thereof when considered in conjunction with the accompanied drawings, in which.

DETAILED DESCRIPTION OF THE PREFERRED EMBODIMENTS

Figure 1:
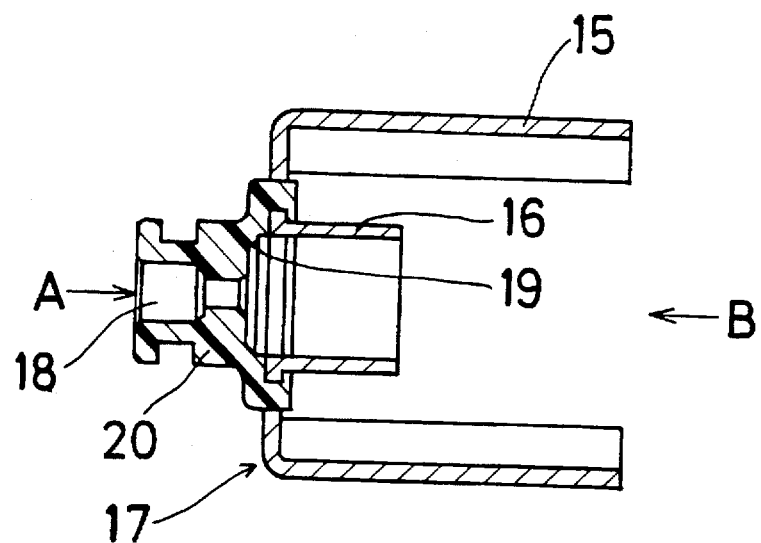
FIG. 1 is a cross section showing a base and a casing, as essential portions of the invention, of an electromagnetic valve device of an embodiment according to the invention.

Referring to FIGS. 1 to 5, an electromagnetic valve device designated by numeral 10 is shown. The electromagnetic valve device 10 includes a solenoid 12 wound around a bobbin 11, a stable core 13 made of magnetic material and formed in the solenoid 12 within a casing 17, a movable core 14 made of magnetic material and slidably mounted within the solenoid 12 so as to form a magnetic gap with the stable core 13, the casing 17 made of magnetic material and unitedly formed with a holder portion 15 thereof which is formed at the outer periphery of the solenoid 12 and with a yoke portion 16 in slidable contact with the movable core 14, a base 20 placed in opposition to the movable core 14, provided with a fluid passage 18 and a seat 19 for valve, and made of synthetic resin, a return spring 21 one end of which is secured to the stable core 13 for biasing the movable core 14 toward the base 20, and a plate 28 made of non-magnetic material and arranged between the movable core 14 and the stable core 13. The base 20 is preferably made of PPS polyphenylene sulfide) resin having high heat resistance.

Although in this embodiment, the return spring 21 is used as an elastic member, a member made of rubber or whatever can be used as long as it adequately biases the movable core 14 relative to the stable core 13 in a prescribed direction. The plate 28 is formed for preventing the movable core 14 from being affected by residual magnetism of the stable core 13 when the solenoid 12 is turned from the excited state to the non-excited state. The electromagnetic valve device 10 in this embodiment is formed with a connector 27.

Fluid is introduced from the fluid passage 18 bored in the base 20 and delivered through a delivery passage 22 formed in the base 20 if the movable core 14 is not in contact with the seat 19 for valve. The stable core 13 is fabricated from pressing a magnetic material plate. A through hole 23 for communicating the atmospheric air is provided at a position of the stable core 13 opposed to the movable core 14 for rendering the movable core 14 readily slidable. One end of the movable core 14 is formed with as indentation 24, in which the return spring 21 is secured as well as in the stable core 13. The other end of the movable core 14 is formed with a hemispheric bump 25. The bump 25 is to be received by the seat 19 of the base 20.

Figure 2:
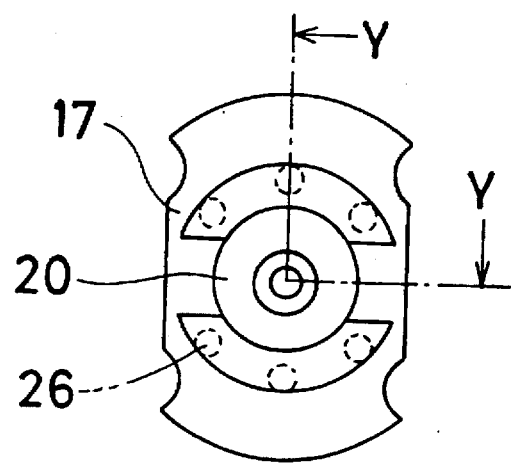
FIGS. 2, 3 are side views of the base and the casing in FIG. 1 when seen from A, B, respectively.
Figure 3:
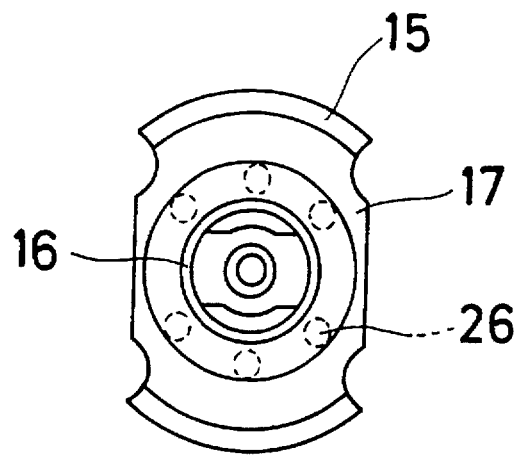
Figure 4:
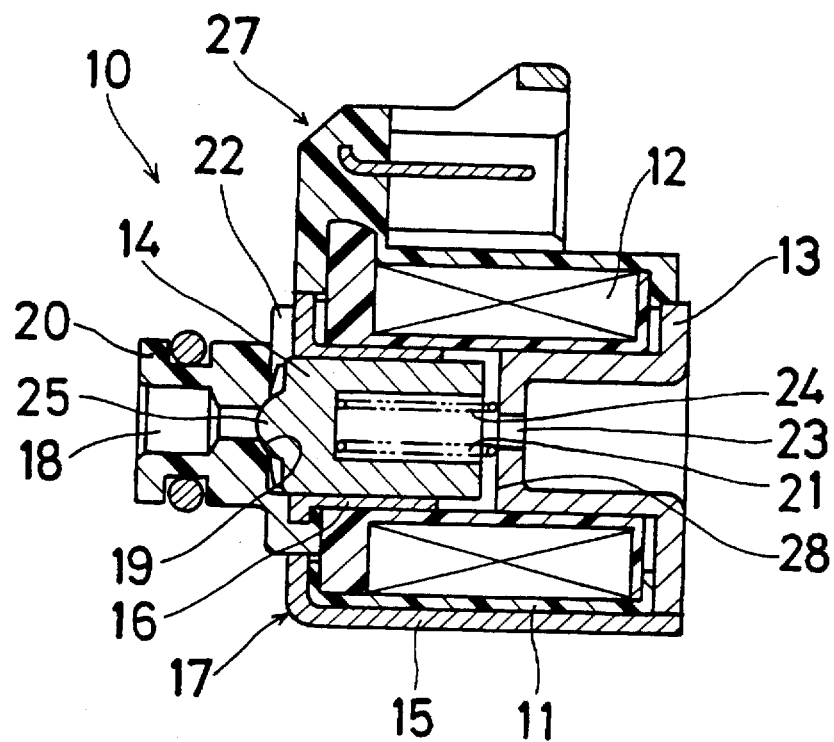
FIGS. 4, 5 are cross sections showing the electromagnetic valve device, cut along Y—Y line in FIG. 2, when de-energized and energized, respectively.
Figure 5:
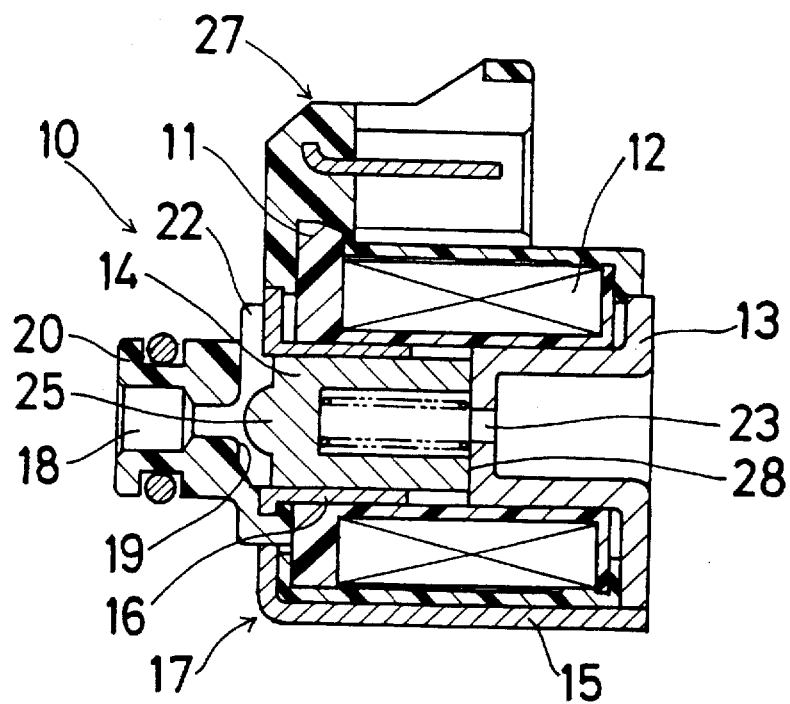
Figure 6:
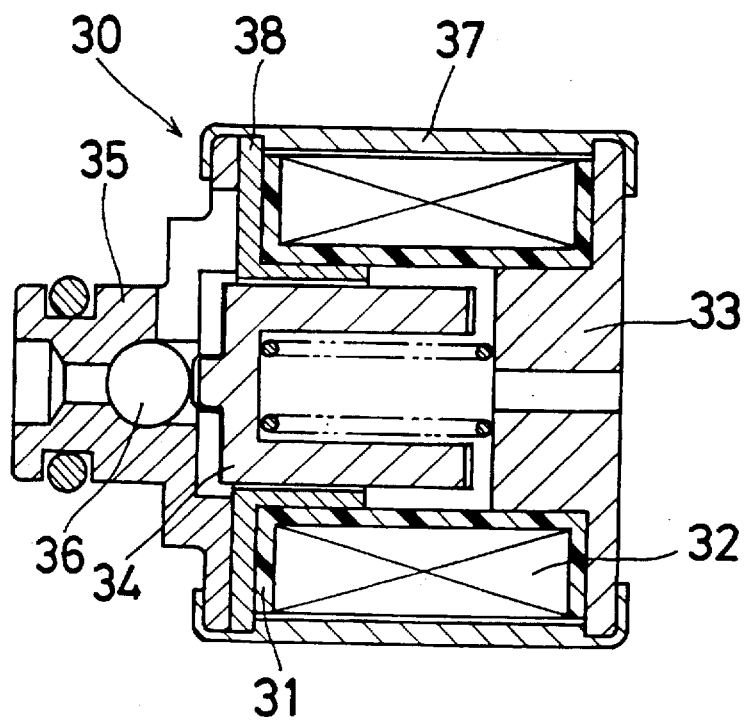
FIG. 6 is a cross section showing a conventional electromagnetic device.

As shown in FIGS. 1 to 3, the holder portion 15 of the casing 17 is formed at a part of the outer periphery of the solenoid 12; and the yoke portion 16 guides the entire periphery of the movable core 14. The base 20 is formed unitedly with the mold of the movable core 14 and the casing 17, so that the movable core 14, the base 20, and the casing 17 are formed almost without any deviation of respective axial positions. Holes 26 for molding are formed in the casing 17 to allow the base 20 to be formed unitedly with the yoke portion 16.

The electromagnetic valve device 10 according to the invention makes the base 20 and the casing 17 adhere to each other by unitedly molding them. After they are molded, the movable core 14 is inserted in the yoke portion 10 and the bobbin 12 is inserted in the holder portion 15, and then, the stable core 13 is attached to the casing 17 after the return spring 21 is arranged in the indentation 24 of the movable core 14. The stable core 13 is fabricated by pressing a steel plate and is attached to the casing 17 by laser welding.

The electromagnetic valve device 10 thus constituted generates a magnetic field upon excitement of the solenoid 12. When the device 10 generates the magnetic field, a magnetic circuit is formed through the movable core 14, the yoke portion 16, holder portion 15, the stable core 13, and again, the movable core 14. Between the stable core 13 and the movable core 14, a magnetic gap is formed due to elastic force of the return spring 21. The movable core 14 is attracted upon excitement of the solenoid 12 toward the stable core 13 because the magnetic force overcomes elastic force of the return spring 21. When the movable core 14 is attracted toward the stable core 13, the seat 19 of the base 20 is separated from the bump 25, so that the fluid passage 18 comes in communication with the delivery passage 22. When the solenoid 12 is de-energized to being non-excited, the magnetic force between the movable core 14 and the stable core 13 disappears, so that the movable core 14 comes in contact with the seat 19 of the base 20 by the elastic force of the return spring 21, thereby cutting off the communication between the fluid passage 18 and the delivery passage 22.

A manufacturing method for the electromagnetic valve device of the embodiment is described as follows. The electromagnetic valve device 10 is fabricated wherein the base 20 provided with a passage extending toward the yoke portion 16 is unitedly molded at the connection between the yoke portion 16 and the holder portion 15 of the casing 17 and the movable core 14 is slidably located inside of the yoke portion 16 of the casing 17 for shutting the passage of the base 20. The solenoid 12 is inserted between the yoke portion 16 and the holder portion 15, the return spring 21 is sandwiched between the movable core 14 and the stable core 13, the stable core 13 is inserted into the solenoid 12; and the end of the stable core 13 is secured to the end of the holder portion 15 by laser welding.

According to the embodiment, the electromagnetic valve device 10 can be formed without any non-magnetic sleeve for guiding the movable core which was inevitable for the conventional device, because of formation of the yoke portion 16 of magnetic material for guiding the movable core 14 in the casing 17 made of magnetic material. The magnetic resistance between the yoke portion 16 and the movable core 14 consequently becomes smaller, so that the magnetic resistance of the entire magnetic circuit does not increase even if the stable core 13 is formed with less volume thereof than that required for the conventional device, and as a result, the stable core 13 can be pressing a plate made of magnetic material. The base 20 is formed by unitedly molding with the casing 17 with the movable core therein eliminating deviations of axial positions of the movable core 14, the base 20, and the casing 17, so that the electromagnetic valve device 10 makes it unnecessary to have the ball valve body made of non-magnetic material disposed between the movable core 14 and the base 20 which was generally used for the conventional devices.

The essential constitution of the electromagnetic valve device according to the invention can be used for other normally closing type electromagnetic valve devices of valve mechanisms, for example, such as a device of which a fluid passage is formed in a movable core.

With the electromagnetic valve device above, the manufacturing cost for the base can be significantly reduced because the base is made of synthetic resin and formed unitedly with the casing made of magnetic material, and because the casing is provided with the yoke portion to slidably contact the movable core for magnetic communication with the movable core. Because the yoke portion of the casing serves as a restriction to the sliding movement of the movable core, the electromagnetic valve device requires no sleeve, thereby reducing the number of assembly parts and the manufacturing cost thereof The electromagnetic valve device further can open and close the fluid passage of the base by slide actions of the movable core, since unitedly molding the casing and the base substantially nullifies positional deviations between the axial center of the movable core and the axial center of the fluid passage of the base, so that the electromagnetic valve device makes unnecessary a non-magnetic valve member arranged between the base and the movable core which was inevitable for the conventional device and makes compact the overall length thereof by the length of the non-magnetic valve member, as well as that by reduction of the number of the assembly parts, the electromagnetic valve device can be manufactured with reasonable cost.

Although a stable core of a conventional device is generally formed by sintering or cutting, the stable core can be formed by pressing a metallic plate, so that the number of processing steps for fabrication of the stable core is reduced, thereby reducing the manufacturing cost of the electromagnetic valve device. The base is unitedly molded with the casing, so that the base can be formed without positional deviations from the movable core, thereby reducing leakage at the valve. Furthermore, the electromagnetic valve device can be assembled easily because assembling for the device can be performed on one side thereof after the base and the casing are unitedly molded.

It is understood that although the present invention has been described in detail with respect to preferred embodiments thereof, various other embodiments and variations are possible to those skilled in the art which fall within the scope and spirit of the invention, and such other embodiments and variations are intended to be covered by the following claims.

What is claimed is:

1. An electromagnetic valve device comprising:
   a solenoid wound around a hollow bobbin;
   a stable core of magnetic material having an end portion disposed at one end of said solenoid and a central portion extending inside said one end of said solenoid;
   a one piece casing of magnetic material comprising a cylindrical yoke portion located inside an opposite end of said solenoid, an end portion extending from said yoke portion over an opposite end of said solenoid and a holder portion extending along an outer periphery of the solenoid in contact with said end portion of said stable core;
   a movable core of magnetic material slidably disposed inside said yoke portion of said casing;
   a base secured to said casing and having a fluid passage therein engageable by said movable core to open and close said passage; and
   an elastic member mounted between the stable core and the movable core for biasing the movable core in a direction to close said passage.

2. An electromagnetic valve device as set forth in claim 1, wherein said stable core is comprised of a pressed plate of magnetic material.

3. An electromagnetic valve device as set forth in claim 1, wherein the base is comprised of synthetic material unitedly molded with said casing.

4. A method for manufacturing an electromagnetic valve device comprising forming a one piece casing having a cylindrical yoke portion, an end portion engageable with an end of a solenoid and a holder portion extendable along the outer periphery of the solenoid;
   positioning a movable core of magnetic material inside the yoke portion for slidable movement therein, molding a base of synthetic resin material having a passage extending therethrough in alignment with said movable core in said casing;
   inserting a solenoid between the yoke portion and the holder portion of said casing;
   locating an elastic member at an end of the movable core remote from said base, inserting a stable core into said solenoid in engagement with the elastic member and the end of the solenoid and securing an end of the stable core to an end of said holder portion.

* * * * *